US006124400A

United States Patent [19]
Chien

[11] Patent Number: 6,124,400
[45] Date of Patent: Sep. 26, 2000

[54] SEMICRYSTALLINE POLYMER ALLOY AND PROCESS FOR PREPARATION

[75] Inventor: James C. W. Chien, Amherst, Mass.

[73] Assignee: Academy of Applied Science, Concord, N.H.; a part interest

[21] Appl. No.: 09/151,225

[22] Filed: Sep. 10, 1998

[51] Int. Cl.[7] .................................................... C08L 53/00
[52] U.S. Cl. ........................ 525/88; 526/347.2; 526/348; 526/351; 526/352
[58] Field of Search .............................. 525/88, 191, 240, 525/241, 903; 526/347.2, 351, 352, 348

[56]   References Cited

U.S. PATENT DOCUMENTS

| | | | |
|---|---|---|---|
| 4,335,225 | 6/1982 | Collette | 525/240 |
| 5,444,134 | 8/1995 | Matsumoto | 526/159 |

OTHER PUBLICATIONS

R. Waymouth; Advances in Stereoblock Polymerization; Presentation at US Patent Office, Nov. 1995.

*Primary Examiner*—Rachel Gorr
*Attorney, Agent, or Firm*—Rines and Rines

[57]   ABSTRACT

This invention relates to polymer alloys and the "one-pot" polymerization process for preparing the same from a single monomer, wherein the product is comprised of two semicrystalline homopolymers having different micro-structures and a well-defined block copolymer having alternating sequences of the two structural segments of the homopolymers, and with the formed alloy being "naturally" compatible without the need for thermomechanical mixing or addition of a compatibilizing additive, including the presence of a comonomer and formed with catalyst compositions enabling the direct synthesis of "naturally" compatibilized polymer alloy that combines four components: two components being organometallic complexes of Group IVB or VIII elements, a third component being a cocatalyst which irreversibly reacts with at least one nonhapto ligand on the transition metal complex, and a fourth component that is a cross-over agent selected from the group of hydrocarbyl or substituted hydrocarbyl compound of Group IIA, IIB or IIIA elements.

13 Claims, 2 Drawing Sheets

SEMICRYSTALLINE POLYMER ALLOY AND PROCESS FOR PREPARATION

TECHNICAL FIELD OF THE INVENTION

This invention relates to the preparation of polyolefin alloys using certain catalyst compositions, being more particularly directed to the use of catalysts comprising organometallic catalyst precursors, cationic forming cocatalysts, and cross-over agents, to polymerize olefins into compatible alloys containing semicrystalline polyolefin sequences with chains of different controlled microstructures.

BACKGROUND OF THE INVENTION

Normally, two different polymers are immiscible. This is true for different polyolefins, assembled from the same monomer molecule, having different geometrical, chemical, or stereochemical isomeric structures, which are generally immiscible. A well known example is low density polyethylene manufactured at high pressure and high density polyethylene manufactured at low pressure. Other prior art examples include the products of first generation Ziegler-Natta catalyzed propylene polymerization, which include high molecular weight crystalline isotactic polypropylene and lower molecular weight amorphous atactic polypropylene. The two polymers are immiscible and the amorphous polymer must be removed or its presence renders the semicrystalline polymer physically and mechanically too weak to be of any commercial value. Sometimes, however, two different polymers can be forced to form a compatible blend by thermomechanical means. This is, however, usually economically unattractive in view of added processing cost and degradation of the polymers. More usefully, two different homopolymers can form a compatible blend with the aid of an agent, such as a block or graft copolymer of the two homopolymers. One of the problems associated with such prior art agents and methods of blending is that it is not a simple task to devise a commercially viable synthetic method for its preparation and subsequently to blend the components into a homogeneous material without phase separation. This objective is difficult to achieve because of the short chain life times in Ziegler-Nafta catalysis.

Well-defined organometallic compounds, such as Group IVB elements of the Periodic Table (Handbook of Chemistry and Physics, 49th Edition, Ed. R. C. Weast, Chemical Rubber Co. Cleveland, 1968) have been found to possess stereoselectivity in the polymerization of propylene depending upon the ligand structure of the cocatalyst.

For example, in one prior art method, chiral group IVB metallocene precursors act as catalysts for the isospecific polymerization of propylene to yield isotactic polypropylene, (See U.S. Pat. No. 4,794,096 and the articles by Kaminsky et al. *Angew. Chem. Int Ed. Engl.* 1985, 24, 307 and by Ewen in *J. Am. Chem. Soc.* 1984, 106, 6355).

In addition, Ewen et al., as disclosed in *J. Am. Chem. Soc.* 1988,110, 6255 and U.S. Pat. No. 4,892,851, taught that zirconocene precursors having bilateral symmetry could produce syndiotactic polypropylene and are capable of polymerizing ethylene, α-olefins and cycloolefin with comparable activity.

In the case of ethylene, most metallocene precursors, including nonrigid complexes, can act as catalysts to polymerize ethylene to linear high density product. In addition, Brookhart et al., as disclosed in *J. Am. Chem. Soc.* 1995, 117, 6414 and PCT WO 96/23010, taught that certain Group VIII organometallic compounds can produce polyolefins with controled branching structures. One example is the 1,4-diaza-1,3-butadien-2-yl(R-DAB)Ni complex.

All of the above precursors are activated by a cocatalyst which transforms the former catalyst into the corresponding cationic species (See U.S. Pat. No. 5,198,401 and EP 573, 403). The cocatalyst comprises a cation which irreversibly reacts with at least one ligand from either the Group IVB or VIII metal complexes to form a catalytically active cationic Group IVB or VIII complex. The counter anion is non-coordinating, readily displaced by a monomer or solvent, has a negative charge delocalized over the framework on the anion or within the core thereof, is not a reducing or oxidizing agent, forms stable salts with reducible Lewis acids and protonated Lewis bases, and is a poor nucleophile.

Other prior types of cocatalyst include Lewis acids which will irreversibly react with at least one ligand from a Group IVB or VIII metal complex to form an anion possessing, many but not all, of the characteristics detailed above (See Marks et al. *J. Am. Chem. Soc.* 1991, 113, 3623).

The cocatalyst which is more commonly employed than the two types mentioned above, however, is the ubiquitous methylalumoxane. Methylalumoxane acts not only as a Lewis acid, but also serves in other useful functions as well.

As previously intimated, high molecular weight isotactic polypropylene, prepared individually in the presence of one of the prior art catalysts described above, is generally immiscible with syndiotactic polypropylene prepared separately. For example, a solvent-cast blend of the two types of stereoisomeric polypropylenes crumbles easily and the tensile bar processed from such blend fails with the least bit of strain. Likewise, linear polyethylenes and branched polyethylene are immiscible.

In another prior process, solutions of two different metallocenes are used to polymerize ethylene as if each is unaffected by the presence of the other. This method is useful for preparing polyethylenes with bimodal molecular weight distribution using two Group IVB metallocenes as disclosed by Ewen (*Studies in Surface Science and Catalysis* Vol. 25 *Catalytic Polymerization of Olefins* Eds. Keii et al., Kodansha, Elsevier, 1986, pp.271), and by Ahlers and Kaminsky (*Makromol. Chem.; Rapid Commun* 1988, 9, 457). The gel permeation chromatograms of the produced bimodal polyethylene are exact superposition of chromatograms for a mixture of polyethylene obtained with the two different metallocenes separately. A polypropylene having multimodal molecular weight distribution was obtained using an ansa-hafnocene and ansa-zirconocene mixture to produce isotactic polypropylenes, albeit having molar masses that are different.

Despite all of these and other prior processes for preparing various polymers, until the advent of the present invention, there has been no process that is capable of forming compatibilized crystalline polyolefin alloys. Unlike the prior art, moreover, the present invention allows the synthesis, directly in a "one-pot" polymerization of a single monomer, useful alloys of semicrystalline polyolefins having different steric and/or geometric microstructures and without the need for subsequent blending of the polyolefins.

OBJECTS OF INVENTION

A primary object of the present invention is to provide new and improved semicrystalline polymer alloys and processes for their preparation with appropriate catalyst compositions, which alloys, unlike prior art experience, are "naturally" compatible and achievable through "one-pot" polymerization of a single monomer.

A further object of the invention, viewed from a generic viewpoint, is to provide novel olefin polymerization catalyst compositions for the preparation of semicrystalline polymer alloys which can generate olefin polymers of distinct and different stereochemical structures $A_n$ and $B_m$ as well as a third block copolymer with the same structures $(A_a B_b)_x$ in its chain, capable of bridging $A_n$ and $B_m$ thus compatibilizing the two isomeric homopolymers. For example, in one preferred embodiment, $A_n$ is an isotactic polypropylene and $B_m$ is a syndiotactic polypropylene having the microstructures shown in the following conventional projection:

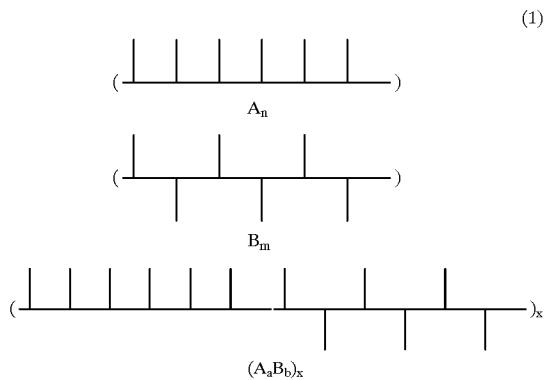

(1)

Though structure 1 represents isotactic and syndiotactic polypropylene, it also generically represents the other stereoisomeric and geometric isomeric polyolefins as well. The subscripts n and m indicate the number of monomeric units in the homopolymers which, in accordance with the invention, are large integers (1,000 to 30,000). The subscripts a, and b indicate the number of monomeric units in the block copolymers which are smaller integers (100 to 3,000) and with values of x ranging from 1 to 100 and denoting the number of $A_a B_b$ blocks.

An additional object is to provide novel catalyst compositions for the "one-pot" direct synthesis of the materials wherein $A_n$ and $A_a$ are stereoregular polypropylenes and $B_m$ and $B_b$ are chain-straightened (or isomerized) polypropylene which contain smaller numbers of pendant methyl groups per 1000 carbon atoms (of the order of 100/1000 C) than the normal number of 333/1000 carbon atoms.

Still a further object is to provide such a catalyst composition that is suitable for the "one-pot" direct synthesis of the materials wherein $A_n$ and $A_a$ are linear polyethylenes and $B_m$ and $B_b$ are branched polyethylenes.

Another object is to provide such novel catalyst compositions for the "one-pot" direct synthesis of materials wherein $A_n$ and $A_a$ are ethylene-α-olefin copolymers and $B_m$ and $B_b$ are linear polyethylenes.

Additionally, a further object is to provide such catalyst compositions suitable for the "one-pot" direct synthesis of materials wherein $A_n$ and $A_a$ are ethylene copolymers having low content (a few percent) of α-olefin, and $B_m$ and $B_b$ are ethylene copolymers having high content (more than ten percent) of α-olefin.

A further object is to provide novel polymer alloys from a single monomer exhibiting properties of semicrystalline plastics with a wide range of stiffness, hardness, impact strength, compatibility with other polymers, and rate of crystallization.

Another object is to provide novel polymer alloys from a single olefinic monomer with flexible, or soft plastic or rigid plastic characteristics, at will as for blown or cast film and blow, injection, or rotational molding applications.

In view of what is believed to be the rather pioneer nature of the invention, a name in the art is lacking for the novel materials of the present invention. The properties of the material suggest the following descriptive terms: interfacial polymer alloy, interpenetrating polymer alloy, naturally compatibilized polymer blends, or simply compatible polymer blends. These terms are used herein interchangeably but do not, of course, exclude other suitable names descriptive of the novelty.

SUMMARY OF THE INVENTION

In summary from one of its viewpoints, the invention embraces a compatible semicrystalline polyolefin alloy comprising two homopolymers $A_n$ and $B_m$ having dissimilar stereoisomeric or dissimilar geometric isomeric structures and a block copolymer of the formula $(A_a B_b)_x$ where n and m are large integers from 1,000 to 30,000, a and b are smaller integers from 100 to 3,000, x is an integer from 1 to 100, wherein the polyolefin alloy has a weight ratio of $A_n$ and $B_m$ between 100:1 and 1:100, and the block copolymer is between 2 and 20% by weight.

The present invention relates to metallocene catalyst compositions which are designed to provide chemical, regiochemical and/or stereochemical control during the polymerization of olefins generally, including specifically ethylene, α-olefins which contains 3 or more carbon atoms ($C_{3+}$-olefin) and substituted vinylaromatic compounds. The present invention provides a novel cross-over agent that promotes and controls the interchange of propagating chains of one type of catalytic site to another, and determines the magnitudes of the before-described n, m, a, b, and x integers in structure 1, thus providing for the formation of materials capable of bridging or compatibilizing two different homopolymers so that a "naturally" compatible blend is produced directly.

The present invention also provides for several classes of polymerization catalysts.

A first class of olefin polymerization catalyst of the present invention is formed from a chiral stereorigid metallocene (iso-P) and a cocatalyst that is capable of the isospecific polymerizing of propylene or higher α-olefin into an isotactic structure. This class of catalyst is also capable of the polymerizing of ethylene into a linear structure and the copolymerizing of ethylene and α-olefin with comparable reactivity ratios for ethylene ($r_1$) and for α-olefin ($r_2$) into copolymers having high content of α-olefin.

A second class of olefin polymerization catalyst of the present invention is formed from a bilaterally symmetric stereorigid metallocene (syn-P) and a cocatalyst capable of the syndiospecific polymerizing of propylene into a syndiotactic structure. This class of catalyst is also capable of the polymerizing of ethylene and α-olefin into copolymer having high content of α-olefin.

A third class of olefin polymerization catalyst of the present invention is formed from a non-rigid metallocene (ata-P) and a cocatalyst capable of polymerizing of ethylene into a linear structure and the copolymerizing of ethylene and a-olefin with large values of $r_1$ and small values of $r_2$ into copolymers having low content of α-olefin.

A fourth class of olefin polymerization catalyst of the present invention is formed from a diimino complex of Group VIII metals (b-E) and a cocatalyst that is capable of the polymerizing of ethylene into a branched structure.

A fifth class of olefin polymerization catalyst of the present invention is formed from a single cyclopentadienyl Group 4 metal compound (syn-S) and a cocatalyst capable of the polymerizing styrene into a syndiotactic structure.

A sixth class olefin polymerization catalyst of the present invention is formed from a cyclopentadienyl zirconium or hafnium compound or a thiobis(alkylphenoxide) complexes of Group IVB metal as disclosed by Miytake et al (*Makromol. Chem. Macromol. Symp.* 1993, 66, 603) (ata-S) and a cocatalyst capable of polymerizing styrene into an atactic structure.

The present invention also provides a novel and, it is believed, first process for the polymerization of propylene block copolymerization in the presence of a catalysts selected from the iso-P and syn-P classes and a second precursor selected also from these two classes but which is not the same as the former, and with a common cocatalyst and cross-over agent.

The present invention further provides a second process for the polymerization of propylene wherein the propylene is polymerized or block copolymerized in the presence of a catalyst of the b-E class and another precursor selected from the iso-P, syn-P and ata-P classes, again with a common cocatalyst and cross-over agent.

The present invention additionally provides a process for the polymerization of ethylene wherein the ethylene is polymerized or block copolymerized in the presence of a catalyst of the b-E class and another precursor selected from the iso-P, syn-P, ata-P classes or monocyclopentadienyl Group IVB metal complexes, and with a common cocatalyst and cross-over agent; a process for the copolymerization of a-olefin and ethylene wherein ethylene-α-olefin are polymerized or block copolymerized in the presence of a catalyst selected from the iso-P or syn-P class and another catalyst of the ata-P class, with a common cocatalyst and cross-over agent.

The present invention is also adapted for the polymerization of styrene wherein the styrene is polymerized or block copolymerized in the presence of a catalyst of the syn-S class and another precursor selected from the ata-S class, and with a common cocatalyst and cross-over agent.

The present invention also embraces the products provided by the above novel processes, including compatible alloys of syndiotactic polypropylene and isotactic polypropylene, compatible alloys of linear polyethylene and branched polyethylene, compatible alloys of low α-olefin ethylene copolymer and high α-olefin ethylene copolymer, and compatible alloys of syndiotactic polystyrene and atactic polystyrene.

Finally, the present invention provides for these types of products in varying ratios of the constituent polymers, that exhibit a range of physical, thermal, mechanical, optical, morphological, viscoelastic, elastic and crystallization properties.

DESCRIPTION OF THE DRAWINGS

The invention will now be described in connection with the accompanying drawings in which.

DETAILED DESCRIPTION OF PREFERRED EMBODIMENTS OF THE INVENTION

Figure 1:
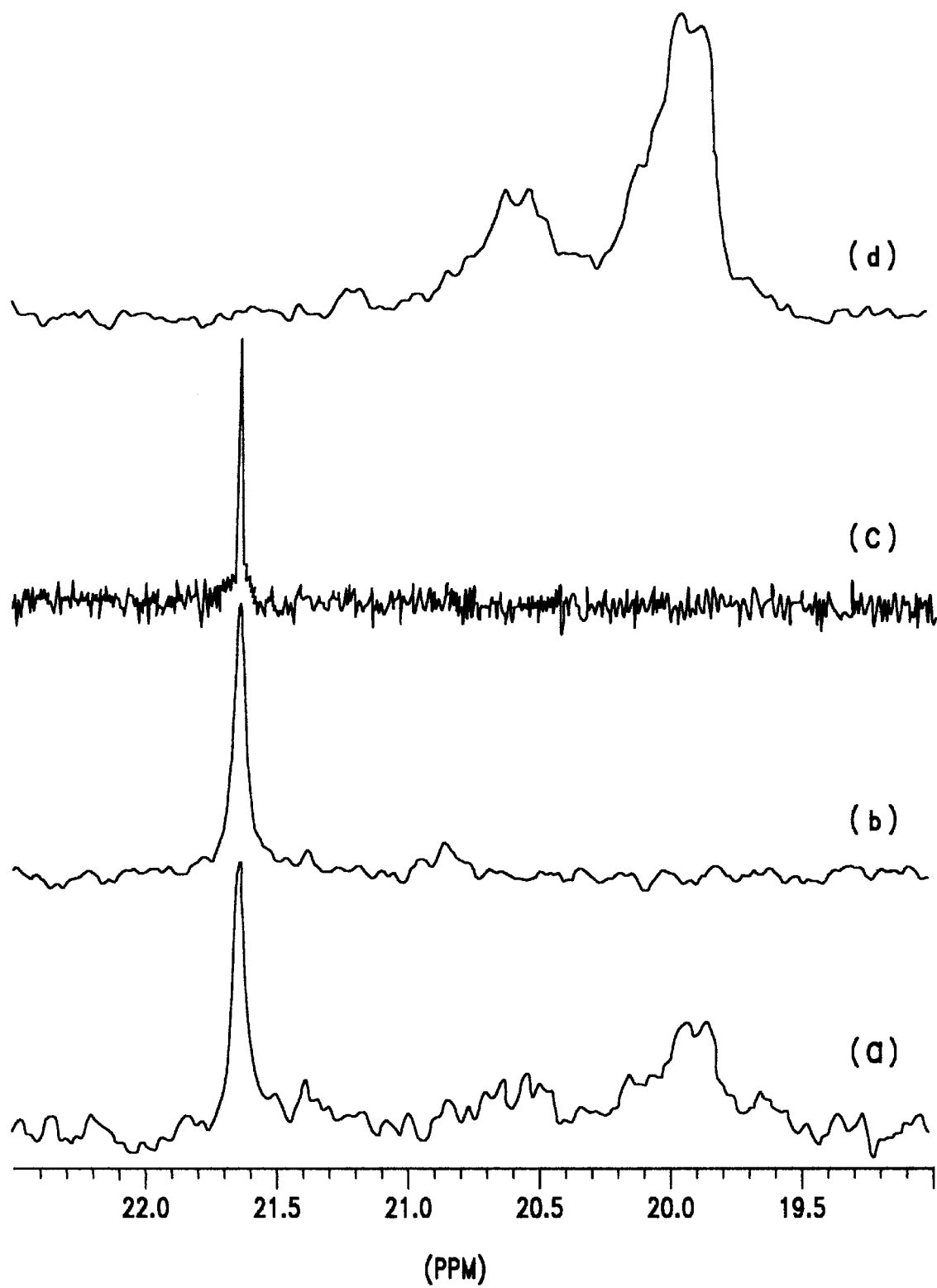
FIG. 1 presents a series of $^{13}C$ NMR spectra for the methyl region of polymer fractions in herein-after presented Table III for later-described Example 9: (a) n-heptane insoluble, (b) n-heptane soluble, (c) n-hexane soluble, (d) diethylether soluble.

The compounds used herein are referred to by either names of common usage or the scientifically correct names for the sake of convenience. The bis(cyclopentadienyl) Group IVB metal compounds may be referred to as "metallocene" embracing all other $\eta^5$-ring such as indenyl, tetrahydroindenyl, fluorenyl, tetrahydrofluorenyl, octahydro-fluorenyl, benz[e]indenyl, benz[f]indenyl, or in general substituted cyclopentadienyl ring and their derivatives with substituents. The metal compounds may have two identical "cyclopentadienyls" or two dissimilar $\eta^5$-rings. Cp, Ind and Flu are used to denote, respectively, the cyclopentadienyl, indenyl and fluorenyl radicals. In addition, a "metallocene" wherein the metal is titanium may be referred to as a "titanocene"; where the metal is zirconium as a "zirconocene", and where the metal is hafnium as a "hafnocene". Other group IVB organometallic compounds having only one of the Cp type ligands will be referred to as half-metallocene.

The olefin polymerization catalysts of the present invention are prepared from two or more metallocene precursors and a cocatalyst, the exception being the branch rearrangement polymerization catalyst of the b-E class whose precursor is α, β-diimine Ni complex. Preferably, further, the metallocene precursors of the present invention are complexes of Group IVB elements, including Ti, Zr and Hf, having one or more $\eta^5$-ligands including, for example, Cp (cyclopentadienyl), Ind (indenyl) and Flu (fluorenyl) having strategically placed hydrocarbyl groups of one (1) to forty (40) carbon atoms.

In the case of two $\eta^5$-ligands, they may be bridged by 3, 2, 1 or 0 atoms selected from the Groups IIIA, IVA, VA, and VIA of the Periodic Table. The number and type of bridging atoms are determined by the stereorigidity and accessibility desired of the metallocene. One pentahapto ligand complex may contain a bridge connecting it to a nonhapto-group having a heteroatom selected from the Groups IIIA to VIA suitable for covalent or dative bonding to the group IVB metal center. The remaining nonhapto-ligands are selected from hydrocarbyls having 1 to 20 carbon atoms and halogen.

The olefin polymerization cocatalysts preferably are Brønsted or Lewis acid and nucleophilic cations. Other possible cocatalysts are hydrocarbyl or substituted hydrocarbyl compounds from the Group IIIA elements. These cocatalyst function by oxidation of an anionic nonhapto-ligand from the organometallic precursor to generate the catalytic-active corresponding cationic Group IVB species. The counter-anion formed by the cocatalyst of the present invention is bulky, inert and noncoordinating toward the Group IVB or VIII metal cation.

The olefin polymerization catalytic composition of the present invention, as earlier discussed, includes a cross-over agent from one of the following: metal hydrocarbyls, metal substituted hydrocarbyls, metal oxyhydrocarbyls of the Group IIA, IIB and IIIA elements. This type of compound finds various usage as scavenger, alkylating and reducing reagent. But its role as cross-over agent has apparently heretofore been unknown, probably because this has been discovered as occuring only above a threshold concentration which is hundreds to thousand times higher than when employed for the other conventional functions.

Considering the application to the preparation of polypropylene alloys, the stereochemical specificity of a metallocene catalyst during the polymerization of propylene is mainly determined by its molecular structure. In the preferred embodiment of the present invention, as earlier described there are two classes of metallocene catalysts, each of which promotes a different stereoregulated propylene insertion process. These are specifically as follows: (1)

iso-P is a racemic metallocene of $C_2$ symmetry or an unbalanced metallocene which catalyzes isotactic enchainment, and (2) syn-P is an achiral bilaterally symmetric metallocene of $C_s$ symmetry which produces syndiotactic enchainment.

Examples of iso-P metallocenes which may be used in the preparation of an isospecific propylene polymerization catalyst are as follows: rac-ethylene-bis(1-$\eta^5$-indenyl)dimethylzirconium (Cat. 1), rac-ethylenebis(1-$\eta^5$-indenyl)dichlorozirconium (Cat. 2), rac-ethylenebis(1-$\eta^5$-4,5,6,7-tetrahydroindenyl)dimethylzirconium, rac-ethylenebis(1-$\eta^5$-4,5,6,7-tetrahydroindenyl)dichlorozirconium, rac-dimethylsilylenebis(1-$\eta^5$-indenyl)dimethylzirconium, rac-dimethylsilylenebis(1-$\eta^5$-indenyl)dichlorozirconium, rac-ethylenebis(1-$\eta^5$-benz[e]indenyl)dimethylzirconium, rac-dimethylsilylenebis(1-$\eta^5$-benz[e]indenyl)dichlorozirconium, rac-dimethylsilylenebis(2-methyl-4-phenyl-1-$\eta^5$-indenyl)dimethylzirconium, and racdimethylsilylenebis(2-methyl-4-naphthyl-1-$\eta^5$-indenyl)dichloro-zirconium. The above metallocenes are arranged in the order of increasing stereoselectivity and decreasing chain termination. Therefore, preferably, the appropriate metallocene for producing isotactic polypropylene (or other isotactic poly-α-olefins) having the desired stereoregularity, melting transition temperature and molecular weight may be selected.

Examples of syn-P metallocenes which may be used in the preparation of a syndiospecific propylene polymerization catalyst are as follows: diphenylmethylidene(1-$\eta^5$-cyclopentadienyl)(9-$\eta^5$-fluorenyl)methylzirconium (Cat. 3) isopropylidene(1-$\eta^5$-cyclopen-tadienyl)(9-$\eta^5$-fluorenyl)dichlorozirconium (Cat. 4), isopropy-lidene(1-$\eta^5$-cyclopentadienyl)(9-$\eta^5$-fluorenyl)dimethylzirconium, and t-butylmethylidene(1-$\eta^5$-cyclopentadienyl)(9-$\eta^5$-fluorenyl)-dichlorozirconium. The above metallocenes are arranged in the order of increasing syndioselectivity and decreasing chain termination. The appropriate metallocene for producing syndiotactic polypropylene of the desired properties may thus be selected.

Most metallocene precursors will catalyze the polymerizing of ethylene to linear polyethylene. In general, the stereorigid metallocenes iso-P and syn-P produce higher molecular weight polyethylenes, whereas nonrigid metallocenes ata-P produce low molecular weight polyethylenes. The more important consideration for the selection of these precursors is that they differ greatly in the relative reactivity in the copolymerization of ethylene and α-olefins with three to ten carbon atoms—for example, butene-1, hexene-1, octene-1, 4-methyl-pentene-1. In general, non-bridged zirconocene has low reactivity toward the α-olefins, as pointed out by Zambelli et al. (Makromol. Chem.; Rapid Commun. 1991, 12, 523); whereas, the stereorigid single atom-bridged zirconocene and Dow In-site® catalyst (EP 416,815A2) exhibits comparable reactivities toward ethylene and $C_{3+}$-olefin. In practice for a mixture of syn-P and ata-P catalysts in the presence of ethylene and an α-olefin, the former produces a copolymer much higher in α-olefin content than the latter product. The In-site® catalyst has the molecular structure dimethylsilylene(1-$\eta^5$-2,3,4,5-teramethylcyclopenta-dieny)(t-butylamido)dichlorotitanium.

Further considering polyethylene alloys, ethylene is polymerized and concomitantly rearranged to form branched polyethylene having from a few to several hundred branches per 1,000 carbons atoms, the branches being hydrocarbyls of one to ten carbon atoms. Propylene or higher α-olefin is polymerized with rearrangement to form branched polyolefin having 80 to 300 hydrocarbyl branches of one to 10-carbon atoms per 1,000 carbon atoms of the macromolecule. Examples of catalysts which may be used in such preparation of branched polyethylene or branched polyolefin of this invention are exemplified by Cat. 5 with the following structure:

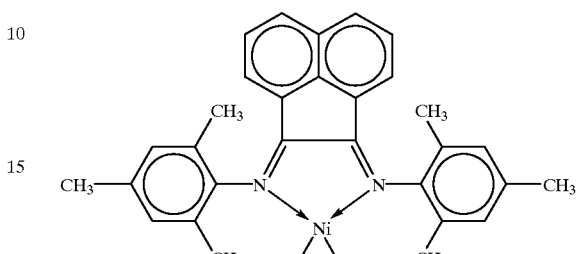

Cat. 5

Other catalyst precursors of Group VIII metals contain 2,6-bis(imino)pyridyl ligands described by Gibson et al., Chem. Commun., 1988, 849, and recently by Brookhart et al., J. Am. Chem. Soc. 1998, 120, 4049.

The cocatalyst of the catalyst composition of the present invention may comprise a wide variety of species which are known to abstract anionic ligand to Group IVB or VII transition metals.

Examples for neutral reducible Lewis acids which may be used in the preparation of such catalyst are as follows: tris(pentafluoro-phenyl)borane, tris(ditrifluoromethyl-phenyl)borane, tris(2,2,2-perfluorobiphenyl)borane.

Examples of Bronsted acids which may be used in the preparation of the catalyst are as follows: phenylammonium tetrakis(pentafluorophenyl)borate, diphenylammonium tetrakis-(pentafluorophenyl)borate and tributylammonium tetrakis(pentafluorophenyl)borate.

Examples for the oxymetalloids which may be used in the preparation of the catalyst of the present invention are as follows: oligomers of methylalumoxane (MAO), ethylalumoxane, propyl-alumoxane and butylalumoxane.

The main rationale for the choice of a cocatalyst is the degree of interaction between the metallocene cation and the counter-anion, either by close approach for ion pair formation or via electron deficient-methyl bridge. Strong interaction tends to lower catalytic activity, selectivity, molecular weight, and most important of all, interference with the cross-over process. Therefore, the cocatalyst employed most frequently in this work is triphenylcarbenium tetrakis (pentafluorophenyl)borate as described by applicant Chien et al. J. Am. Chem. Soc. 1991, 113, 8570, which is free of the drawbacks of the other cocatalysts. It is designated hereinafter as the "Cocat" unless otherwise noted.

Using any of the above catalyst compositions as a single precursor produces only a single kind of homopolymer. Using two of above precursors together, however, produces a mixture of two different homopolymers that are immiscible. Thus, the present invention provides a novel component cross-over agent which promotes the interchange of propagating chain of one catalyst with that of a second different catalyst with the consequent formation of block copolymer which acts to compatibilize the homopolymers also formed in the system. The product is thus a naturally compatible blend of the two different homopolymers.

In the presence of two catalysts $C_A$ and $C_B$ which produce polymers independently with microstructure A and B at respective rate constants $k_A$ and $k_B$, which can be precisely and separately determined by measurement of homopolymerization rate, the desired ratio of the two homopolymers is given by:

$$\frac{[A]}{[B]} = \frac{k_A[C_A]}{k_B[C_B]}$$

This polymer alloy composition can be obtained by using the needed amount of the two catalysts. Therefore, polymer alloys having [A]/[B] ratio between 100:1 and 1:100 can be readily prepared.

In accordance with the present invention of the first previously mentioned process for the polymerization of propylene by a mixture of metallocenes iso-P and syn-P, a new substance is formed in the presence of the cross-over agent that is not formed in its absence. The presence of the new polymeric substance is established by fractionation of the product and $^{13}$C-NMR determination of the polymer microstructure of the fraction. In the absence of the cross-over agent, fractionation resulted in two dominant components with NMR spectra characteristic for the syndiotactic polypropylene and for the isotactic polypropylene. In the presence of a cross-over agent, on the other hand, an additional component is isolated whose NMR spectra is clearly the sum of the syndiotactic and isotactic sequences. It is, therefore, a stereoblock copolymer (see U.K. U.S. Pat. No. 9102679.9 and U.S. Pat. No. 5,756,614).

The amount of the block copolymer formed in the present invention can be controled, by varying the ratio of cross-over agent to total catalyst, to lie between 2% and 20% of the total polymer.

In the before-described second process employing metallocene which polymerize ethylene to a linear structure, and b-E catalyst which polymerizes ethylene to a branched structure, a third substance is formed in the presence of the cross-over agent according to fractionation and $^{13}$C-NMR, which has the block copolymer structure of linear and branched polyethylene sequences. The product is a "naturally" compatible alloy of linear polyethylene and branched polyethylene.

Turning to the previously described third process employing stereorigid metallocene which copolymerizes $C_{3+}$-olefin to high level with ethylene and ata-P metallocene which copolymerizes $C_{3+}$-olefin to low level with ethylene, again a third substances is formed according to fractionation and $^{13}$C-NMR, which has the block structure of linear low density polyethylene of two dissimilar $C_{3+}$-olefin contents. This product is also a "naturally" compatible alloy of ethylene-$C_{3+}$-olefin copolymers having designed densities.

Similarly, in connection with the earlier mentioned fourth process employing syn-S and ata-S precursors in the presence of a cross-over agent, there is formed, according to fractionation and $^{13}$C-NMR, in addition to syndiotactic polystyrene and atactic polystyrene, also a block copolymer of these two steric structures. This product once more is a "naturally" compatible alloy of syndiotactic and atactic polystyrenes. The role of the cross-over agent again is to transfer the propagating chain on one metal center carrying it to the other metal center, and vice versa. Consequently, the next monomers inserted will have the respective stereodirecting or chemical-directing influence of the new metal center. By selecting the structure and concentration of the cross-over agent for a particular monomer, its concentration and temperature, the before-identified structural parameters n, m, a, b and x in structure 1, can be adjusted for desired polymer alloy properties.

The catalyst compositions of the present invention, therefore, provide for the use of cross-over agents selected from the group of hydrocarbyls and substituted hydrocarbyls of Group IIA, IIB, and IIIA metals. Illustrations, but not limiting examples, are as follows: trimethylaluminum, triethylaluminum, tri-i-propylaluminum, tri-i-butylaluminum, and compounds containing two or more Al atoms linked through heteroatoms such as $(C_2H_5)_2Al$—O—$Al(C_2H_5)_2$, methylalumoxane, ethylalumoxane and butylalumoxane, dibutyl magnesium, and diethylzinc.

Polymerization Procedure

A 250 mL crown-capped glass pressure reactor with a magnetic stirring bar was first evacuated, flushed with argon, then charged with 50 mL of purified and oxygen free toluene. The system was evacuated again and saturated with gaseous monomer for ca. 20 min. to 15 psig. In the case of liquid monomer, i.e. styrene or α-olefin, the desired quantity is introduced with syringe. Cross-over agent, organometallic precursor, and cocatalyst were injected with syringe as toluene solutions in this order at 5 min. intervals to allow complete mixing. Upon completion of polymerization, the mixture was quenched with acidic methanol (containing 2% HCL), filtered, washed with methanol, and dried at 70° C. under vacuum to a constant weight.

Polymer Characterization

The polymer product was fractionated by a Kumagawa apparatus using several solvents under refluxing conditions. The solvents in the increasing order of boiling point are as follows: acetone, diethylether, n-pentane, n-hexane, n-heptane and n-octane. The microstructures of the collected fractions were determined by $^{13}$C-NMR (Bruker AMX-500, 125.77 MHz).

The extent of phase mixing, and conversely phase separation were investigated on compatible polyolefin alloys of this invention and compared with simple blends of the constituent homopolymers. Specimen of the latter were prepared by dissolving the polymers under nitrogen atmosphere in one of these solvents: toluene (bp 110.60° C.), p-xylene (bp 137.8° C.), or mesitylene (bp 164.7° C. The polymer solution was poured into a Teflon dish, the solvent removed with a Dean Stark trap, and the solid dried under vacuum at 70° C. About 1 wt % of BHT (2,6-di-t-butyl-4-methylphenol) was added as an antioxidant. The polymer was press-molded into a 15 mm long, 6 mm wide, and 0.7 mm thick dog-bone-shaped specimen at 175° C. The specimen was subjected to strain imposed by an Instron machine at an uniaxial expansion rate of 150 mm/min (approximately 1000% gauge length/min). Measurement was repeated after the specimen was annealed at 110° C. for 2 hrs. The "naturally" compatible alloys of this invention were found to exhibit high tensile modulus, high stress after yield strain, and ductile failure; and these mechanical properties were improved by annealing of the specimen. In contrast, simple blends of the homopolymers displayed poor mechanical properties which deteriorated further after annealing.

Atomic force microscopy was carried out with a "Nanoscope III" scanning probe microscope (Digital Instruments) at ambient conditions in the tapping mode/height mode and tapping mode/phase mode. AFM imaging revealed microphase separation in a specimen.

The $T_g$ and heat of fusion ($\Delta H_f$) were measured by differential scanning calorimetry (DSC; Perkin-Elmer DSC4). The sample was annealed at 180° C. for 10 min and crystallized by cooling at a rate of 10° C./min to 50° C. in the instrument prior to recording of the DSC curve. The rate of crystallization was measured in the isothermal mode. The following example specifically illustrates the present invention.

ISOTACTIC POLYPROPYLENE/SYNDIOTACTIC POLYPROPYLENE SYSTEMS

EXAMPLE 1

An isospecific precursor (rac-ethylene-bis(1-$\eta^5$-indenyl)-dimethylzirconium, Cat. 1) and a syndiospecific precursor (di-phenylmethylidene(1-$\eta^5$-cyclopentadienyl)(9-$\eta^5$-fluorenyl)-dimethylzirconium, Cat. 3) were employed in the polymerizations. Tri-i-butylaluminum (TIBA, 5 mM), Cat. 1 (5 $\mu$M), Cat. 3 (5 $\mu$M) and cocatalyst (cocat., 10 $\mu$M) were introduced to initiate the polymerization. After completion, 0.67 g of polymer was obtained; the activity of polymerization was $3.4 \times 10^7$ g PP/(mol Zr. [$C_3H_6$]. h). Differential scanning calorimetry showed the polymer to have a peak melting transition of $T_m$=148.0° C. and enthalpy of fusion of $\Delta H_f$=13.8 cal/g. Isothermal cooling showed very rapid crystallization to near completion in ca. 10 min., the slope of heat out-flow vs. time ($\Delta H/\Delta t$) being only 0.2 mwatt/g/min at 3 min.

EXAMPLES 2–5

Example 1 was repeated except that the conditions indicated in Table I were employed. The polymers obtained in these examples 1 to 5 of this invention have $T_m$ between 140 and 148° C., and $\Delta H_f$ between 10 and 15 cal/g, all these values being smaller than the single metallocene catalyzed polypropylenes. Furthermore, the materials crystallize rapidly, exhibit toughness characteristic of compatible polymer alloys, and display only microscopic phase separation according to AFM.

COMPARATIVE EXAMPLES 6–7

Propylene polymerization was performed with the conditions of Example 1 but catalyzed by only a single zirconocene precursor; Cat. 3 in Example 6 and Cat. 1 in Example 7. The results in Table I below, showed these polymerizations to occur with lower activity than in Examples 1–5. The homopolymers formed, display higher $T_m$ and $\Delta H_f$ than the compatible blends produced with two zirconocenes. The syndiotactic polypropylene of Example 6 crystallizes very slowly and has $\Delta H/\Delta t$=0.9 mwatt/g/min at 30 min. A 1:1 mixture of the homopolymers isolated in Examples 6 and 7, were dissolved and solvent-cast into specimen which were melted in DSC and cooled for crystallization. The rate was slow, crystallization was less than half complete at 30 min, and the slope $\Delta H/\Delta t$ was 0.8 mwatt/g/min. The specimen showed macroscopic phase separation by AFM, were without physical integrity; and crumbled with slight bending.

COMPARATIVE EXAMPLE 8

The amount of TIBA was lowered to 5 $\mu$M in Example 8 (Table I) but keeping the other catalyst components the same as in Example 1. The polymer obtained is characterized by two $T_m$, much higher $\Delta H_f$, slow crystallization, and poor mechanical properties consistent with an incompatible blend. Therefore, the present invention provides for a threshold amount of cross-over agent to produce the requisite block copolymer.

ISOTACTIC POLYPROPYLENE/ISOMERIZED POLYPROPYLENE SYSTEMS

EXAMPLE 9

A zirconocene compound (Cat.1) and a mesityl DAB Ni complex (Cat. 5) were employed to polymerize and block copolymerized propylene. In one Schlenk tube, solutions of Cat. 1 and MAO were mixed one hr. prior to use. Another Schlenk tube was used similarly to preactivate Cat. 5 with MAO. A 250 mL crown-capped glass pressure reactor with a magnetic stirring bar was first evacuated, flushed with argon and charged with 50 mL of toluene. The system was evacuated, TIBA (5 mM) was introduced. Finally, the two preactivated catalyst solutions were injected to initiate the polymerization. Upon completion the polymerization mixture was quenched with acidic methanol (containing 2% HCl), filtered, washed with methanol and dried at 70° C. under vacuum to a constant weight. The polymer yield was 8.79 g in 2 min, which exhibits $T_g$ at −80° C. and the main $T_m$ peak at 141.9° C. with a shoulder at 127.8° C. (results being given in Table II).

Figure 2:
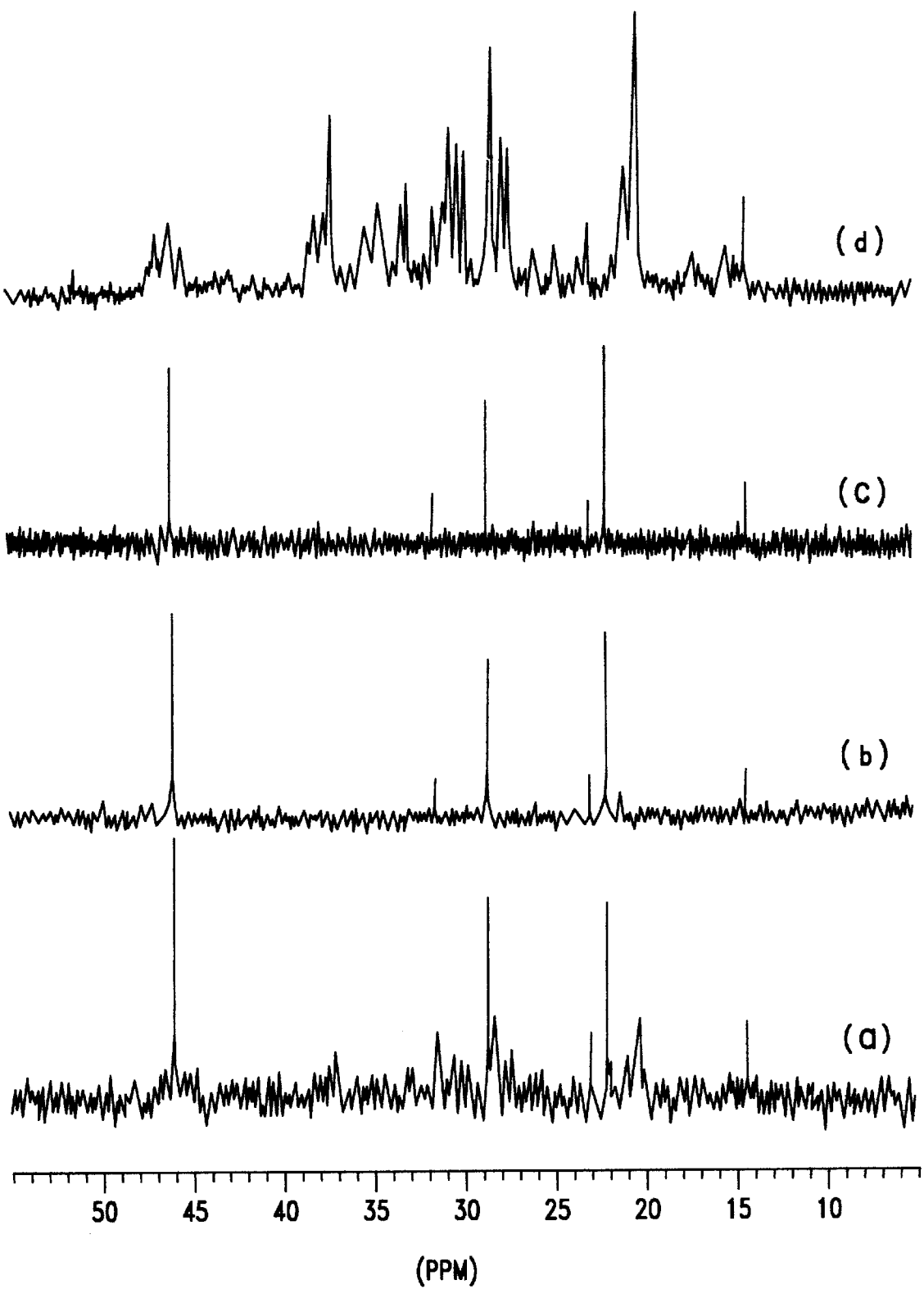
FIG. 2 presents secondary and tertiary carbon NMR of polymer fraction in Table III for Example 9: (a) n-heptane insoluble, (b) n-heptane soluble, (c) n-hexane soluble, (d) diethylether soluble.

The polymer was fractionated and $^{13}$C-NMR spectra determined. Table III summarized the weight % for each fraction and the steric pentad data. The $^{13}$C-NMR methyl spectra and s and t carbon spectra are shown in previously described FIGS. 1 and 2, respectively. The three major components are the diethyl ether fraction (27.5%) of isomerized (chain-straightened) polypropylene; the isotactic polypropylenes in the hexane/heptane soluble fractions (28.1 %); the heptane insoluble fraction (58.3 %) containing

TABLE I

| | | Catalyst system | | | Polymer | | |
|---|---|---|---|---|---|---|---|
| | | [Cat.1] ($\mu$M) | [Cat.3] ($\mu$M) | [TIBA] (mM) | Yield (g) | Activity × $10^{-7}$ g/ (mol Cat. [monomer] · h) | $T_m$ (° C.) | $\Delta H_f$ cal/g |
| Example | 1 | 5 | 5 | 5 | 0.64 | 3.4 | 148.0 | 13.8 |
| | 2 | 2 | 8 | 5 | 0.55 | 3.0 | 144.6 | |
| | 3 | 8 | 2 | 5 | 0.74 | 2.5 | 140.2 | 14.9 |
| | 4 | 3.5 | 6.5 | 5 | 0.67 | 3.2 | 143.6 | |
| | 5 | 6.5 | 3.5 | 5 | 0.72 | 2.7 | 145.8 | |
| Example | 6 | 0 | 5 | 5 | 0.77 | 2.0 | 150.2 | 20.7 |
| | 7 | 10 | 0 | 0 | 2.15 | 1.9 | 152.0 | 30.5 |
| | 8 | 5 | 5 | 0.005 | 0.38 | 1.2 | 147.0 149.3 | 25.8 |

$P_{C_3H_4}$ = 15 psig, Tp = 0° C., [cocat] = [Cat.1] + [Cat.3], Cat.1 = rac-ethylenbis(1-$\eta^5$-indenyl) dimethylzirconium; Cat.3 (diphenylmethylidene)(1-$\eta^5$-cyclopentadienyl)(9-$\eta^5$-fluorenyl) dimethylzirconium.

most of the block copolymer of isomerized and isotactic polypropylene.

TABLE II

| | | Catalyst system | | | Polymer | | | | | |
|---|---|---|---|---|---|---|---|---|---|---|
| | | [Cat.2] ($\mu$M) | [Cat.5] ($\mu$M) | [TIBA] (mM) | Yield (g) | Activity × $10^{-7}$ g/ (mol Cat. [monomer] · h) | Tg | $T_{m1}^b$ (° C.) | $T_{m2}^c$ | $\Delta H_f$ cal/g |
| Example | 9 | 20 | 200 | 5 | 8.79 | 1.7 | −8 | 127.8 | 141.9 | 20.1 |
| | 10 | 20 | 100 | 5 | 8.06 | 6.9 | −20 | 127.8 | 142.3 | 27.9 |
| | 11 | 20 | 50 | 5 | 5.15 | 11.7 | −20 | 127.2 | 143.1 | 25.0 |
| Comp. Ex | 12 | 0 | 200 | 0 | 1.94 | 15.4 | −35 | — | — | — |

$P_{C_3H_6}$ = 15 psig, Tg = 20° C., [MAO]/[Cat.2] + [Cat.5] = 1,000, Cat.2 = rac-ethylenebis(1-$\eta^5$-indenyl) diclorozirconium, Cat.5 = mesityl-DABNiBr$_2$.

TABLE III

| | | $^{13}$C-NMR Methyl region | | | |
|---|---|---|---|---|---|
| Fraction of Polymer from Example 9 | wt % | Figure | [mmmm] (%) | All other pentads (%) | $^{13}$C NMR s + t carbons |
| Acetone solible | 3.0 | | | | |
| Diethylether soluble | 27.5 | 1 d | 0 | 100 | 2 d |
| n-Pentane soluble | 0.3 | | | | |
| n-Hexane soluble | 2.0 | 1 c | 100 | 0 | 2 c |
| n-Heptane soluble | 16.1 | 1 b | >90 | <10 | 2 b |
| n-Heptane insoluble | 58.3 | 1 a | 24 | 26 | 2 a |

EXAMPLES 10–11

Example 9 was repeated except that the conditions in Table II were employed to obtain different polymeric alloys with different activity.

COMPARATIVE EXAMPLE 12

Example 9 was repeated but using only the mesityl DAB Ni precursor (Cat. 5). The isomerized polypropylene formed was mixed with equal weight of isotactic polypropylene of Comparative Example 6. The blend was clearly incompatible as judged by $T_g$, $T_m$, solubility, NMR, AFM, and the mechanical properties as described above bear no resemblance to the polymers of Examples 9–11.

LINEAR POLYETHYLENE/BRANCHED POLYETHYLENE SYSTEMS EXAMPLES 13–14

Example 9 was repeated excepted that the monomer was ethylene and the conditions in Table IV were employed. The products of Example 13 and 14 were extracted with refluxing solvent and examined with $^{13}$C-NMR. The three major fractions are branched polyethylene, linear polyethylene and block copolymer of these two types of polyethylene sequences.

TABLE IV

| | | Catalyst system | | | Polymer | |
|---|---|---|---|---|---|---|
| | | [Cat.2] ($\mu$M) | [Cat.5] ($\mu$M) | [TIBA] (mM) | Yield (g) | Activity × $10^{-7}$ g PE/(mol Cat. [(C$_2$H$_4$] · h) |
| Example | 13 | 10 | 25 | 5 | 0.62 | 2.0 |
| | 14 | 10 | 10 | 5 | 0.63 | 1.8 |

TABLE IV-continued

| | | Catalyst system | | | Polymer | |
|---|---|---|---|---|---|---|
| | | [Cat.2] ($\mu$M) | [Cat.5] ($\mu$M) | [TIBA] (mM) | Yield (g) | Activity × $10^{-7}$ g PE/(mol Cat. [(C$_2$H$_4$] · h) |
| Comp. Ex. | 15 | 0 | 25 | 5 | 0.45 | 1.0 |
| | 16 | 10 | 0 | 5 | 0.30 | 1.7 |

Ethylene polymerization, $P_{C2H4}$ = 15 psig, $T_p$ = 23° C., [MAO]/[Cat.1] + [Cat. 5]) = 1500, Cat. 2 = rac-ethylenebis(1-$\eta^5$-indenyl)dichlorozirconium, [Cat.5] = mesityl-DABNiBr$_2$.

COMPARATIVE EXAMPLES 15–16

Comparative Example 12 was repeated except using ethylene as the monomer. A 50:50 by weight blend of the two products did not have the physical mechanical properties of the polymers of Example 13 and 14.

ETHYLENE LOW HEXENE COPOLYMER/ETHYLENE HIGH HEXENE COPOLYMER SYSTEMS

EXAMPLE 17

A low $r_2$ catalyst, bis(cyclopentadienyl) dimethylzirconium (Cat. 6) and a high $r_2$ catalyst, isopropylidene(1-$\eta^5$-cyclopen-tadienyl)(9-$\eta^5$-fluorenyl) dimethylzirconium (Cat. 4) were employed to copolymerize ethylene and hexene-1. At 15 psig and 10 vol. %, respectively activated with the cocat. and 5 mM of TIBA was used as cross-over agent and at 0° C. The obtained compatible copolymer alloy exhibit dart impact resistance in excess of 800.

COMPARATIVE EXAMPLES 18–19

Example 17 was repeated using only Cat. 6 with cocat in comparative Example 18; and Cat. 4 with cocat in comparative Example 19. The products were combined and solvent-cast into film, showing very low dart impact resistance.

LINEAR POLYETHYLENE/ETHYLENE BUTENE COPOLYMER SYSTEMS

EXAMPLE 20

One of the zirconocene employed here is Cat. 4 isopropylidene (1-$\eta^5$-fluoronyl)zirconium dichloride which has high reactivity toward $\alpha$-olefin (high $r_2$ value). The other metallocene (Cat. 6) is an ethylene selective zirconium complex having the bridging ligand

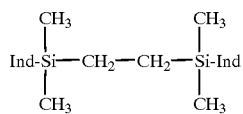

which does not polymerize α-olefin. Equal molar (10 μM) mixtures of the zirconocenes, with the same amount of cocat, and 15 psig of ethylene and 20 vol. % of butene were polymerized at 0° C. The product was found to be an exceedingly tough and strong material.

COMPARATIVE EXAMPLES 21–22

Example 20 was repeated excepted using only Cat. 4 with cocat in Example 21 and just Cat. 6/cocat in example 22 to give ethylene-butene copolymer and linear polyethylene, respectively. Blends of the two polymers were incompatible and has no useful properties.

Further modifications will occur to those skilled in the art, and such are considered to fall within the spirit and scope of the invention as defined in the claims.

What is claimed is:

1. A compatible semicrystalline polyolefin alloy comprising two homopolymers $A_n$ and $B_m$ having dissimilar stereoisomeric or dissimilar geometric isomeric structure and a block copolymer of the formula $(A_a B_b)_x$ where n and m are large integers from 1,000 to 30,000, a and b are smaller integers from 100 to 3,000, x is an integer from 1 to 100, wherein the polyolefin alloy has a weight ratio of $A_n$ and $B_m$ between 100:1 and 1:100, and the block copolymer $(A_a B_b)_x$ is between 2% and 20% by weight.

2. A compatible polyolefin alloy in accordance with claim 1 wherein $A_n$ and $A_a$ have the isotactic polypropylene microstructure and $B_m$ and $B_b$ have the syndiotactic polypropylene microstructures.

3. A compatible polyolefin alloy in accordance with claim 1 wherein $A_n$ is isotactic polypropylene and $B_m$ is syndiotactic polypropylene.

4. A compatible polyolefin alloy in accordance with claim 1 wherein $A_n$ and $A_a$ have the syndiotactic polystyrene microstructure and $B_m$ and $B_b$ have the atactic polystyrene microstructure.

5. A compatible polyolefin alloy in accordance with claim 1 wherein $A_n$ is syndiotactic polystyrene and $B_m$ is atactic polystyrene.

6. A compatible polyolefin alloy in accordance with claim 1 wherein $A_n$ is isotactic polypropylene, $B_m$ is isomeric polypropylene having less than the normal number of 333 pendant methyl groups per 1000 carbon atoms, and $(A_a B_b)_x$ is a block copolymer comprising sequences of isotactic and isomerized polypropylene units.

7. A compatible polyolefin alloy in accordance with claim 1 wherein $A_n$ is syndiotactic polypropylene, $B_m$ is isomeric polypropylene having less than the normal number of pendant methyl groups, and $(A_a B_b)_x$ is a block copolymer comprising sequences of syndiotactic and isomeric polypropylene units.

8. A compatible polyolefin alloy in accordance with claim 1 wherein $A_n$ is linear polyethylene, $B_m$ is branched polyethylene, and $(A_a B_b)_x$ is a block copolymer comprising sequences of linear and branched polyethylenes.

9. A compatible polyolefin alloy in accordance with claim 1 wherein $A_n$ and $B_m$ are ethylene-α-olefin copolymers having dissimilar compositions and $(A_a B_b)_x$ is a block copolymer with the corresponding compositions.

10. A compatible polyolefin alloy in accordance with claim 1 wherein $A_n$ is a copolymer of ethylene with one to five percent of α-olefin, $B_m$ is a copolymer of ethylene with ten to fifty percent of α-olefin, and $(A_a B_b)_x$ is a block copolymer with the corresponding compositions.

11. A compatible polyolefin alloy in accordance with claim 1 wherein $A_n$ is a linear polyethylene and $B_m$ is an ethylene-α-olefin copolymer, and $(A_a B_b)_x$ is a block copolymer comprising linear polyethylene and ethylene-α-olefin sequences.

12. A compatible polyolefin alloy in accordance with claims 9 to 11 wherein the α-olefin has three to ten carbon atoms.

13. A compatible alloy of claim 1 wherein the polyolefin prepared is characterized as belonging to one from the group consisting of (1) impact and abrasion resistant semicrystalline plastics, (2) rigid plastics, (3) soft plastics, (4) flexible plastics, (5) elastomers, (6) thermoplastic elastomers, (7) viscous grease, and (8) viscous fluid.

* * * * *